United States Patent
Yeh et al.

(10) Patent No.: US 8,294,690 B2
(45) Date of Patent: *Oct. 23, 2012

(54) METHOD AND DEVICE FOR DETECTING TERMINAL CONNECTION OF 4-TERMINAL OR 5-TERMINAL RESISTIVE TOUCH PANEL

(75) Inventors: Shang-Tai Yeh, Taipei (TW); Chia-Ling Sun, Taipei (TW)

(73) Assignee: Egalax_Empia Technology Inc., Taipei (TW)

( * ) Notice: Subject to any disclaimer, the term of this patent is extended or adjusted under 35 U.S.C. 154(b) by 406 days.

This patent is subject to a terminal disclaimer.

(21) Appl. No.: 12/640,966

(22) Filed: Dec. 17, 2009

(65) Prior Publication Data

US 2011/0012861 A1   Jan. 20, 2011

Related U.S. Application Data

(63) Continuation of application No. 12/640,355, filed on Dec. 17, 2009.

(30) Foreign Application Priority Data

Jul. 17, 2009 (TW) .............................. 98124191 A
Jul. 17, 2009 (TW) .............................. 98124192 A

(51) Int. Cl.
*G06F 3/045* (2006.01)
(52) U.S. Cl. ....................................... 345/174; 324/525
(58) Field of Classification Search .................. None
See application file for complete search history.

(56) References Cited

U.S. PATENT DOCUMENTS

| | | | | |
|---|---|---|---|---|
| 6,611,257 B1 * | 8/2003 | Dotson et al. | ................. | 345/174 |
| 6,753,853 B1 * | 6/2004 | Dotson | ................. | 345/173 |
| 6,765,558 B1 * | 7/2004 | Dotson | ................. | 345/173 |
| 6,980,201 B1 * | 12/2005 | Dotson | ................. | 345/173 |
| 7,154,452 B2 * | 12/2006 | Nakamura et al. | ............. | 345/1.1 |
| 7,327,354 B2 * | 2/2008 | Dotson | ................. | 345/174 |
| 7,439,961 B2 * | 10/2008 | Kong | ................. | 345/173 |
| 7,737,701 B2 * | 6/2010 | Williamson et al. | ......... | 324/527 |

* cited by examiner

*Primary Examiner* — Jason Olson
(74) *Attorney, Agent, or Firm* — WPAT PC; Justin King

(57) ABSTRACT

A device and method for detecting connections of a 4- or 5-terminal resistive touch panel are disclosed. The device includes five terminals and a detecting unit. When the five terminals are connected to the touch panel, the detecting unit provides a high potential and a low potential to first and last of the five terminals, respectively, thereby determining whether the touch panel is a 4- or 5-terminal resistive touch panel by determining if there is a closed circuit between the two terminals.

24 Claims, 15 Drawing Sheets

When touch panel is 4-terminal resistive touch panel, providing one of second high and low potentials to one of four neighboring terminals in five terminals, and simultaneously or sequentially providing the other one of second high and low potentials to the other three of four neighboring terminals in five terminals
510

Determining whether touch panel connected to first or last four terminals of five terminals based on whether there is a closed circuit between terminals provided with second high and low potentials
520

FIG.5

When four terminals connecting to 4-terminal resistive touch panel, providing third high and low potentials to first pair of terminals connected to different layers of 4-terminal resistive touch panel
710

Determining terminals connected to same layer of 4-terminal resistive touch panel 22 based on signal of at least one terminal in the other second pair of terminals connected to 4-terminal resistive touch panel 22
720

FIG.7

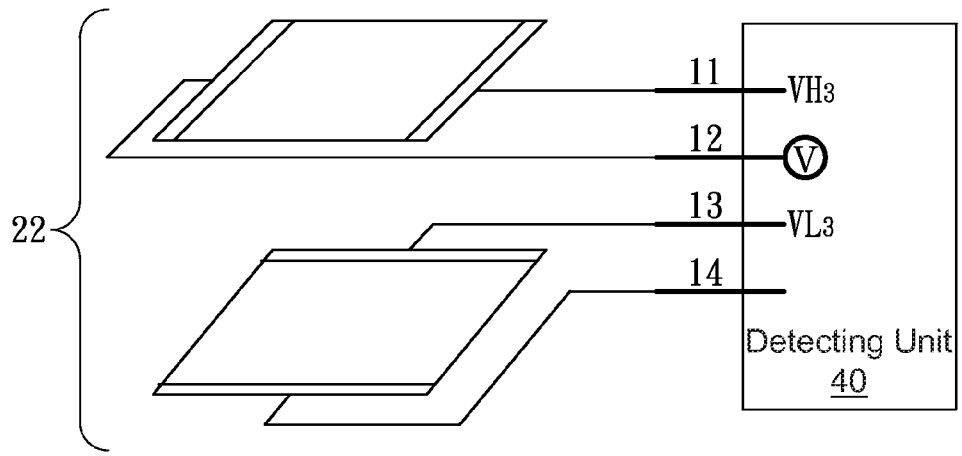

FIG.8

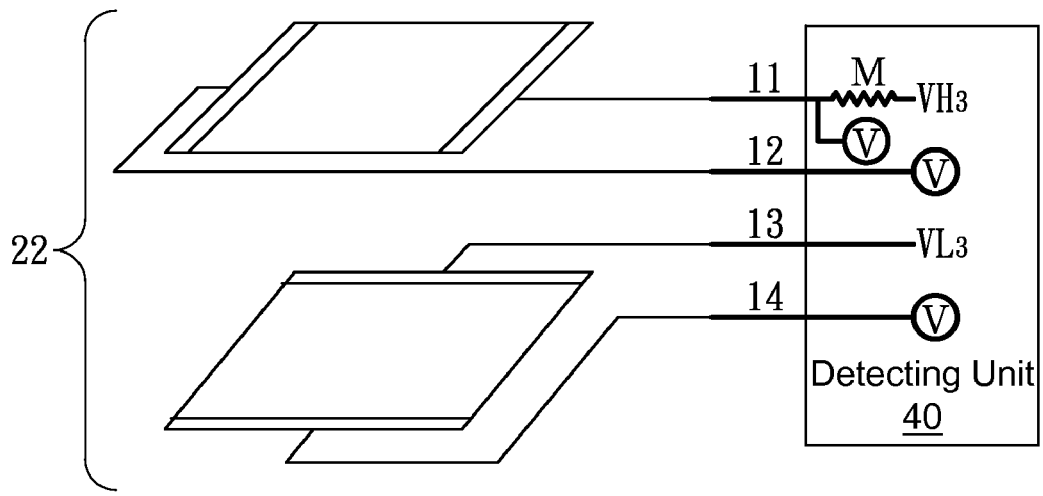

FIG.9B

Providing fourth high and low potentials to two terminals connected with 4-terminal resistive touch panel when four terminals are connected with 4-terminal resistive touch panel
1010

Determining first pair of terminals connected to different layers of 4-terminal resistive touch panel based on whether there is open or closed circuit between terminals provided with fourth high and low potentials
1020

FIG.10

METHOD AND DEVICE FOR DETECTING TERMINAL CONNECTION OF 4-TERMINAL OR 5-TERMINAL RESISTIVE TOUCH PANEL

RELATED APPLICATION

This is a Continuation Application of U.S. patent application Ser. No. 12/640,355, filed Dec. 17, 2009, which claims priority from TAIWAN Application No. 098124191, filed Jul. 17, 2009, each of which are incorporated herein by reference.

FIELD OF THE INVENTION

The present invention relates to a method and device for detecting 4-terminal or 5-terminal resistive touch panels, and more particularly, to a method and device for detecting terminal connections of 4-terminal or 5-terminal resistive touch panels that share the same kind of connection head.

BACKGROUND OF THE INVENTION

FIG. 1A is a schematic diagram illustrating a traditional resistive touch panel 10, which includes an upper panel 102, a lower panel 102 and some insulating materials 106 dispersed between the two panels. When the resistive touch panel is under external stress, the stress-receiving zone of the upper panel contacts the lower panel 104, thereby a touched location can be determined by detecting electrical signals between the two panels.

FIG. 1B is a schematic diagram illustrating a traditional 4-terminal resistive touch panel with four terminals connecting to different sides of the upper and lower panels 102 and 104. Additionally, FIG. 1C is a schematic diagram illustrating a traditional 5-terminal resistive touch panel with one terminal connecting the upper panel 102 while the other four terminals connecting to the four corners of the lower panels 104.

The 4-terminal or 5-terminal resistive touch panel needs to be connected to a controller, which is usually done through a connection head. However, there are many different ways of connecting the touch panel and the connection head due to different manufacturers.

SUMMARY OF THE INVENTION

In order for a controller to adapt to both 4- and 5-terminal resistive touch panels, the present invention connects the 4- or 5-terminal resistive touch panel through five terminals (including first, second, third, fourth and fifth terminals) arranged in parallel, and detects connection relationships between each terminal and the touch panel.

The present invention provides a method and device for detecting connections of a 4- or 5-terminal resistive touch panel that uses five terminals arranged in parallel to connect to the 4- or 5-terminal resistive touch panel. By providing high and low potentials to the first and last of the five terminals, it can be determined that whether the touch panel is a 4-terminal resistive touch panel or a 5-terminal resistive touch panel.

The present invention further provides a method and device for detecting connections of a 4-terminal resistive touch panel that determines whether the 4-terminal resistive touch panel is connected to the first four (first to fourth) or last four (second to fifth) terminals by providing one of high and low potentials to one of the first and last terminals (e.g. first or fifth terminals), while simultaneously or sequentially providing the other one of high and low potentials to the other three neighboring terminals that are adjacent to that one of the first and last terminals.

The present invention further provides a method and device for detecting connections of a 4-terminal resistive touch panel that, after determining four terminals that are connected to the 4-terminal resistive touch panel, provides high and low potentials to two of the four terminals that are connected to different layers of the 4-terminal resistive touch panel, respectively, so as to determine which of the four terminals are connected to the same layer of the 4-terminal resistive touch panel.

The present invention further provides a method and device for detecting connections of a 5-terminal resistive touch panel that, after determining four terminals that are connected to the same layer of the 5-terminal resistive touch panel, provides high and low potentials to two neighboring terminals that are connected to neighboring corners of the 5-terminal resistive touch panel, respectively, so as to determine the connection relationships between the four terminals and four corners on the same layer of the 5-terminal resistive touch panel.

BRIEF DESCRIPTION OF THE DRAWINGS

The present invention can be more fully understood by reading the following detailed description of the preferred embodiments, with reference made to the accompanying drawings, wherein:

FIG. 5 is a flowchart illustrating the method for detecting connections of a 4- or 5-terminal resistive touch panel according to a third embodiment of the present invention;

FIG. 7 is a flowchart illustrating the method for detecting connections of a 4-terminal resistive touch panel according to a fourth embodiment of the present invention;

FIG. 8 is a schematic diagram illustrating connection with a 4-terminal resistive touch panel by a detecting unit according to the fourth embodiment of the present invention;

FIG. 9B is a flowchart illustrating determination of whether the 4-terminal resistive touch panel is being touched by the detecting unit according to the fourth embodiment of the present invention;

FIG. 10 is a flowchart illustrating determination of a pair of terminals connected to different layers of the 4-terminal resistive touch panel 22 according to a fifth embodiment of the present invention;

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention. It should also be noted that some elements in the figures are not shown, some may be relatively exaggerated and some may be omitted for clarity and brevity.

Normally, a 4-terminal resistive touch panel is connected to a controller via a 4-terminal connection head. Similarly, a 5-terminal resistive touch panel is usually connected to a controller via a 5-terminal connection head. Thus, the present invention proposes a detecting method and device of a 5-terminal connection head, which can be connected to a 4-terminal or 5-terminal resistive touch panel and used for determining connection relationships between five terminals within the 5-terminal connection head and the 4-terminal or 5 terminal resistive touch panel.

Figure 1A:
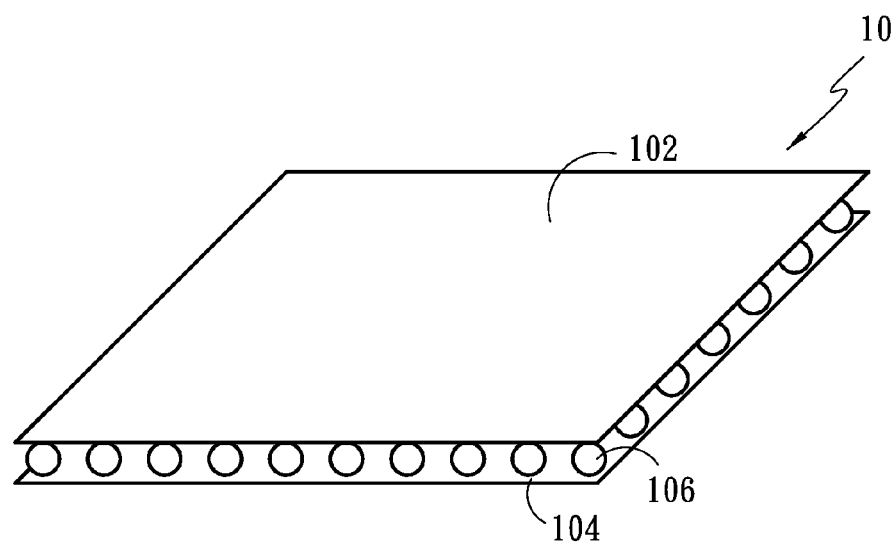
FIG. 1A is a schematic diagram illustrating a traditional resistive touch panel.
Figure 1B:
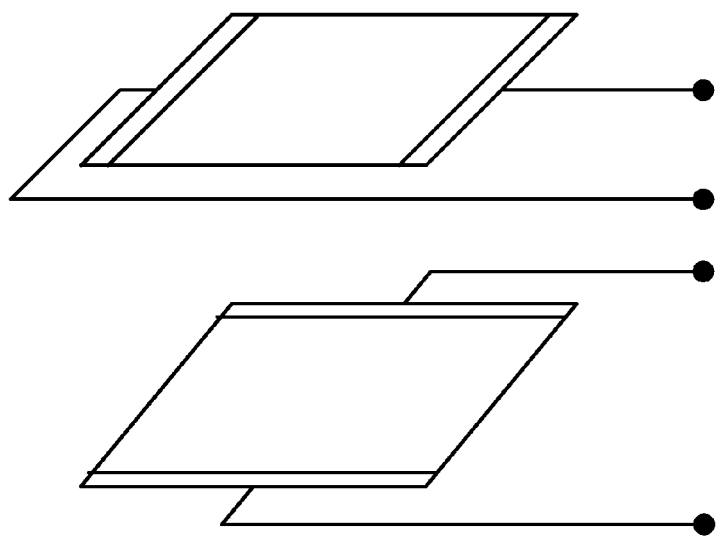
FIG. 1B is a schematic diagram illustrating a 4-terminal resistive touch panel.
Figure 1C:
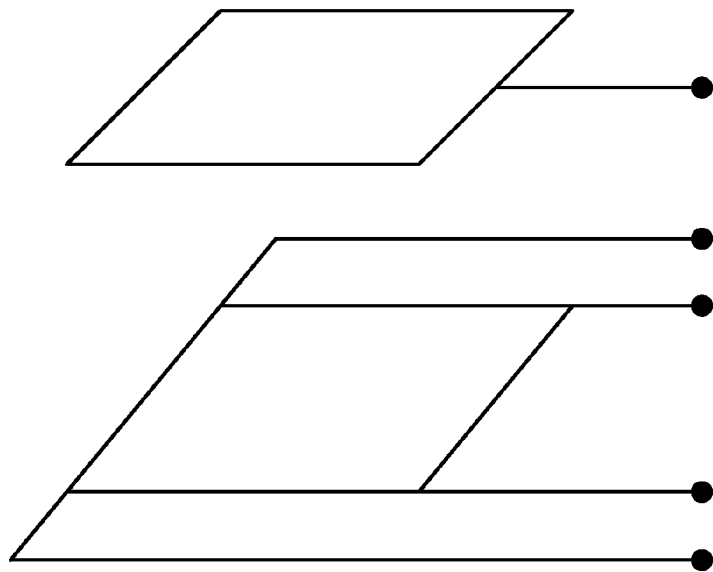
FIG. 1C is a schematic diagram illustrating a 5-terminal resistive touch panel.
Figure 2:
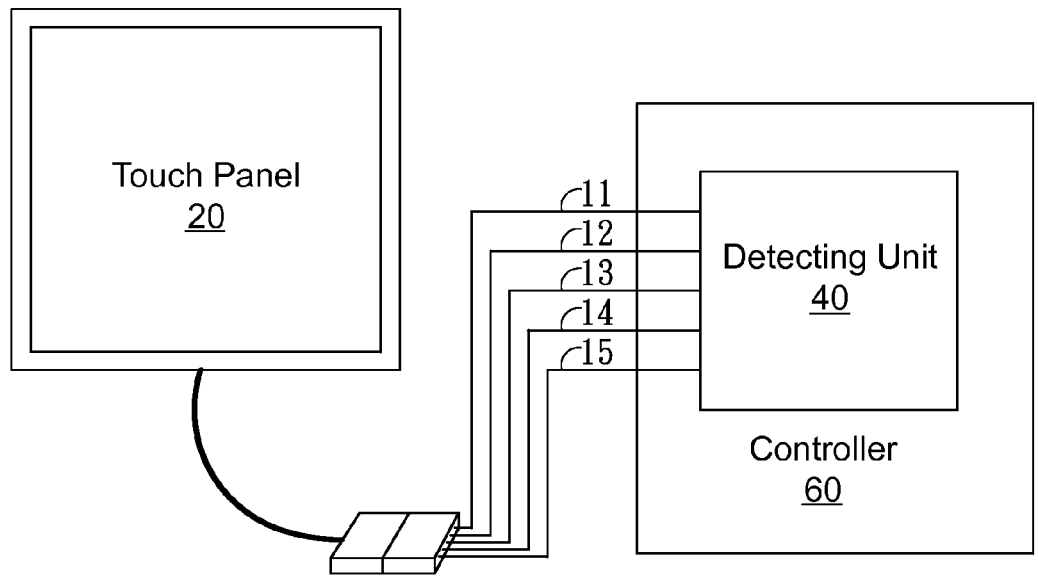
FIG. 2 is a block diagram depicting a first embodiment of the method of the present invention.

A first embodiment of the present invention provides a device for detecting connections of a 4-terminal or 5-terminal resistive touch panel. As shown in FIG. 2, the device includes a detecting unit 40 and five terminals arranged in parallel, which includes a first terminal 11, a second terminal 12, a third terminal 13, a fourth terminal 14 and a fifth terminal 15, wherein at least four of the five terminals are connected to a touch panel 20. The detecting unit 40 is connected to the touch panel 20 via the terminals for detecting the connection relationships between the terminals and the touch panel. The detecting unit 40 may be included in the controller 60 or externally. The controller 60 is connected to the touch panel 20 via the terminals, and controls the touch panel 20 for detecting touched locations according to the connection relationships detected by the detecting unit 40. In a preferred embodiment of the present invention, the terminals can be directly connected to the touch panel 20 not necessarily through a connection head.

In a preferred embodiment of the present invention, the detecting unit may include a driving element for providing high and low potentials; a detecting element (e.g. a differential amplifier) for detecting voltage, current or logic level; and a determining element for determining the signals output by the detecting element. The determining element can be implemented by circuits or programmable processor.

Figure 3:
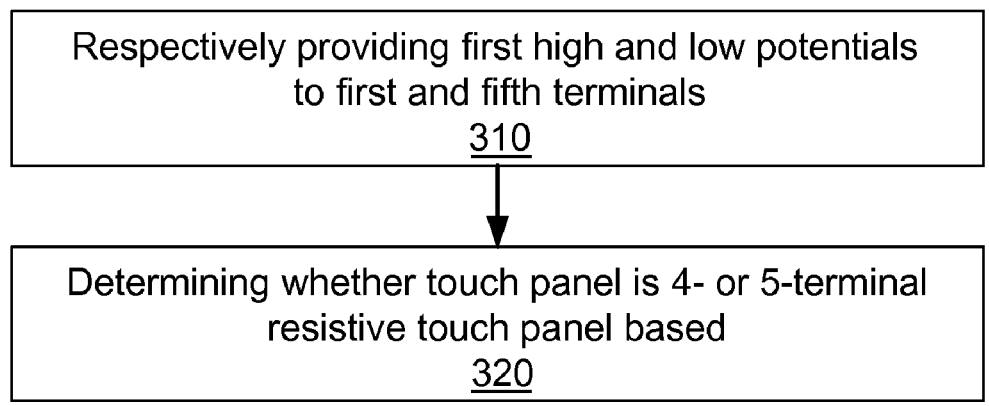
FIG. 3 is a flowchart illustrating the method for detecting connections of a 4- or 5-terminal resistive touch panel according to a second embodiment of the present invention.

A second embodiment of the present invention provides a method for detecting connections of a 4-terminal or 5-terminal resistive touch panel as shown in FIG. 3. First, in step 310, a first high potential and a first low potential are provided at the first and fifth terminals 11 and 15, respectively. Next, in step 320, it is determined whether the touch panel is a 4-terminal or 5-terminal resistive touch panel according to whether there is an open circuit or a closed circuit between the first and fifth terminals 11 and 15. When the touch panel 20 is a 5-terminal resistive touch panel, the first and fifth terminals 11 and 15 are connected to the same layer of the 5-terminal resistive touch panel.

Figure 4A:
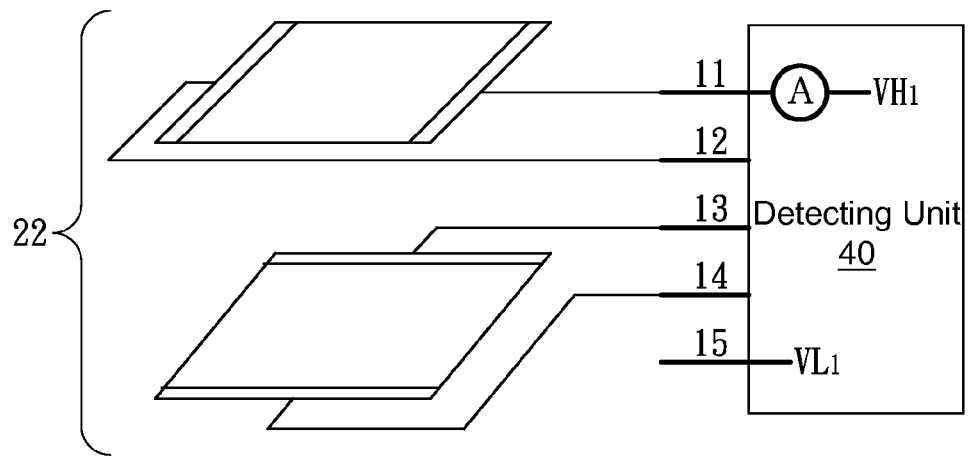
FIGS. 4A to 4F are schematic diagrams illustrating connection with a 4- or 5-terminal resistive touch panel by a detecting unit according to the second embodiment of the present invention.
Figure 4B:
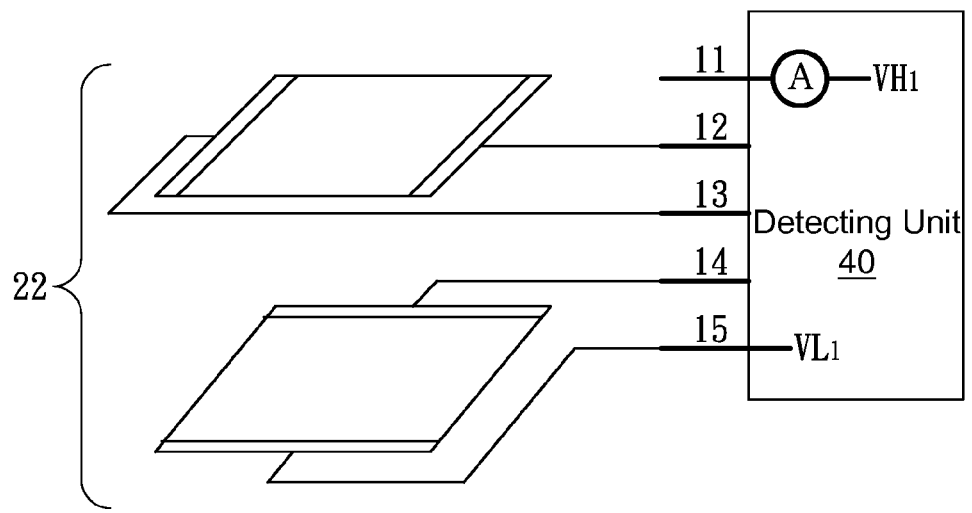
Figure 4C:
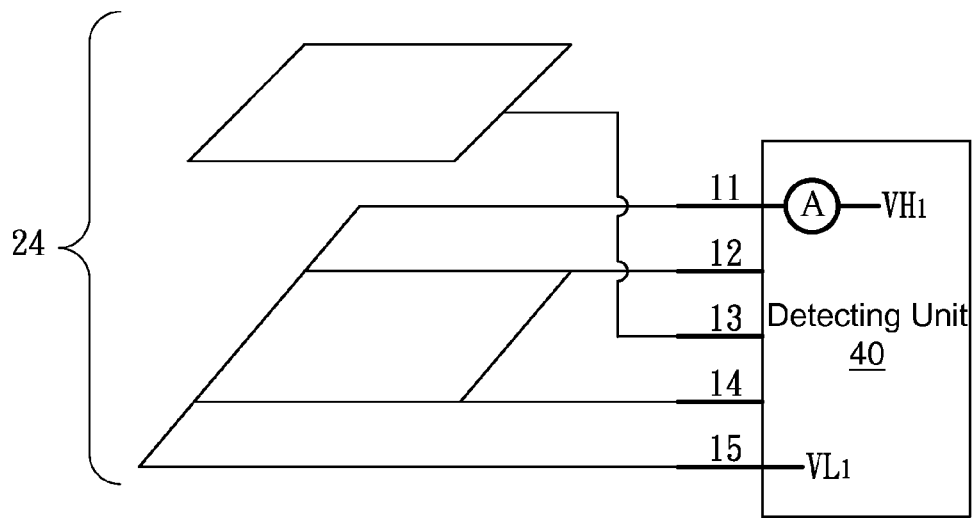

In a preferred example, the provision of the first high and low potentials and the sensing of the connection between the first and fifth terminals 11 and 15 to determine whether it is an open circuit or a closed circuit are achieved by the detecting unit 40. FIGS. 4A and 4B are schematic diagrams illustrating the detecting unit 40 of the present embodiment connected with the 4-terminal resistive touch panel 22 via four of the five terminals. FIG. 4C is a schematic diagrams illustrating the detecting unit 40 of the present embodiment connected with the 4-terminal resistive touch panel 22 via four of the five terminals. In FIGS. 4A and 4B, the 4-terminal resistive touch panel 22 may obviously connect to either the first terminal 11 or the fifth terminal 15. Thus, when four of the five terminals are connected to the 4-terminal resistive touch panel 22 and the first and fifth terminals 11 and 15 are respectively provided with a first high potential VH1 and a first low potential VL1, then it must be an open circuit between the first and fifth terminals 11 and 15.

Conversely, when the five terminals are connected to the 5-terminal resistive touch panel 24, wherein the first and fifth terminals 11 and 15 are respectively provided with the first high potential VH1 and the first low potential VL1, then it is a closed circuit between the first and fifth terminals 11 and 15. In this way, it can be determined whether the touch panel 20 is a 4-terminal resistive touch panel 22 or a 5-terminal resistive touch panel 24. To this end, when the five terminals are connected to the 5-terminal resistive touch panel 24, the first and fifth terminals 11 and 15 must be connected to the same layer of the 5-terminal resistive touch panel 24. In addition, the terminal (a wiper terminal) connected to the other layer of the 5-terminal resistive touch panel 24 is connected to one of the second, third and fourth terminals 12, 13 and 14.

Figure 4D:
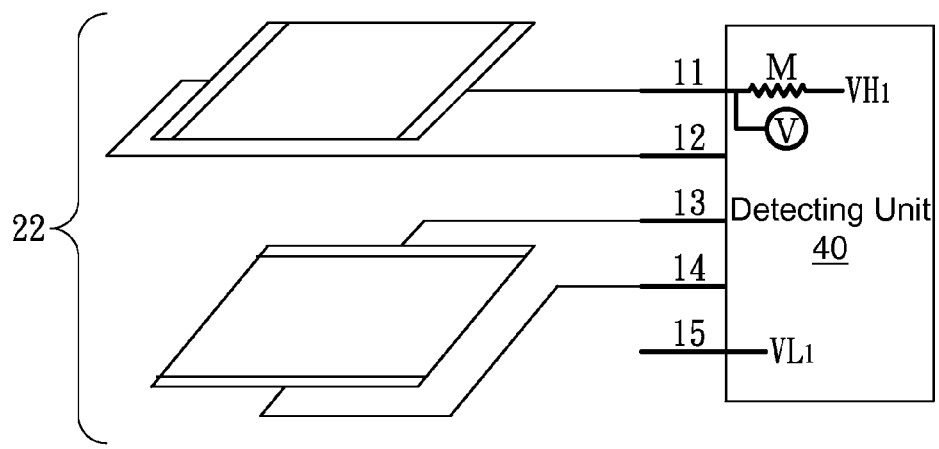
Figure 4E:
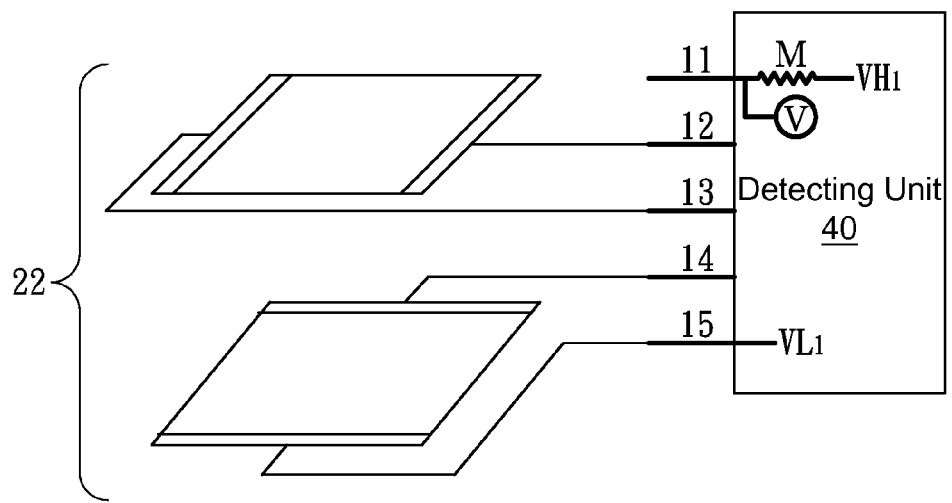
Figure 4F:
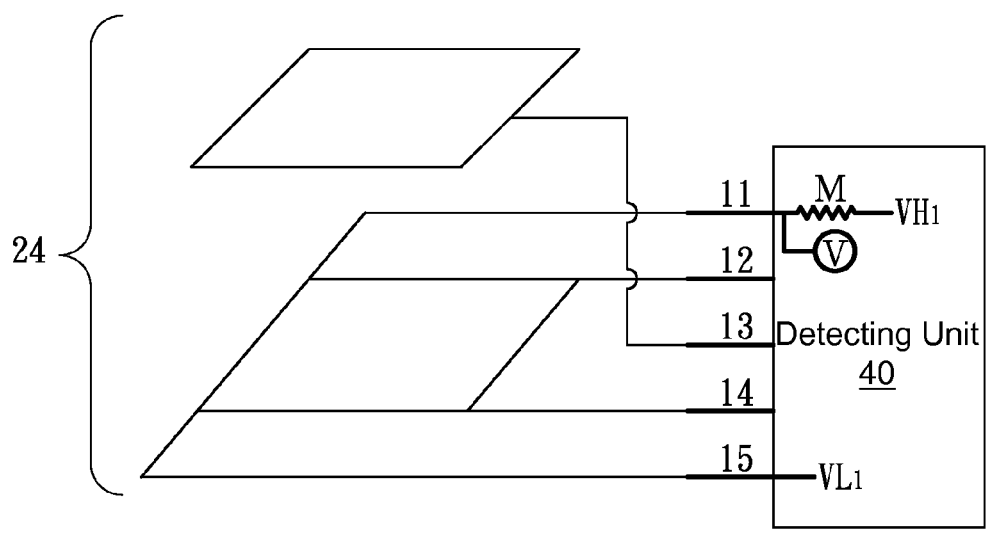

In an example of the present invention, as shown in FIGS. 4A to 4C, the determination of the connection relationship between the first and fifth terminals 11 and 15 can be done through an ammeter A that measures the current of the first or fifth terminals 11 or 15 for determining whether there is a close or open circuit therebetween. In another example of the present invention, as shown in FIGS. 4D and 4E, the first high and low potentials VH1 are provided by an electrical element M, and the connection relationship between the first and fifth terminals 11 and 15 are determined by sensing the terminals electrically coupled to the electrical element M, wherein the resistance value of the electrical element M is larger than that of the touch panel. For example, in FIG. 4D, the electrical element M is a pull-up resistor. When a voltmeter V senses the potential of the first terminal 11 being the first high potential VH1, then there is an open circuit between the first and fifth terminals 11 and 15. In contrast, when the potential of the first terminal 11 is lower than a predetermined threshold, then there is a closed circuit between the first and fifth terminals 11 and 15. Similarly, the first low potential VL1 can also be provided via the electrical element M.

In other words, an open or closed circuit can be determined by an ammeter or voltmeter and the signal potentials between the electrical element M and the terminals. When the resistance of the electrical element M is large enough (larger or much larger than that of the touch panel 20 and there is a closed circuit between the terminals provided with high and low potentials, then there will be a significant potential difference between two ends of the electrical element M. For example, when the low potential is provided by the electrical element M and when the terminals provided with high and low potentials are closed circuit or open circuit, the signal between the electrical element and the terminal will approach or equal to the high or low potential, wherein the signal between the electrical element and the terminal can be a high logic potential or a low logic potential that can be directly used as a control or input signal for other electrical element. The sensing method just mentioned is more efficient, since it determines the logic potential of the signal between the electrical element and the terminal without measuring the actual value of the signal.

The various methods for determining a close or open circuit can be applied to other embodiments of the present invention, the present invention include but not limited to those methods mentioned above, and one skilled in the art may conceive other methods that are also applicable to the present invention.

A third embodiment of the present invention is a method for detecting whether the first four or last four terminals are connected to a 4-terminal resistive touch panel. First, in step 510, when the touch panel 20 is a 4-terminal resistive touch panel 22, one of a second high and low potentials is provided to one of four neighboring terminals in the five terminals, while sequentially or simultaneously providing the other one of the second high and low potentials to the other three of the four neighboring terminals. Subsequently, in step 520, it is determined whether the first four or last four terminals are connected to the touch panel 20 by determining whether there is a closed circuit between two terminals provided with the second high and low potentials, respectively. The terminals provided with the second high and low potentials only include one of the first and second terminals 11 and 15.

When the terminals (the first four terminals) provided with the second high and low potentials include the first terminal 11, and the connections between the terminals provided with the second high and low potentials are all open circuits, then the touch panel 20 is connected to the last four terminals; otherwise, the touch panel 20 is connected to the first four terminals. Similarly, when the terminals (the last four terminals) provided with the second high and low potentials include the fifth terminal 15, and the connections between the terminals provided with the second high and low potentials are all open circuits, then the touch panel 20 is connected to the first four terminals; otherwise, the touch panel 20 is connected to the last four terminals.

In a preferred example of the present invention, the provision of the second high and low potentials and the sensing of the connection between the first and fifth terminals 11 and 15 to determine whether it is an open circuit or a closed circuit are achieved by the detecting unit 40.

Figure 6A:
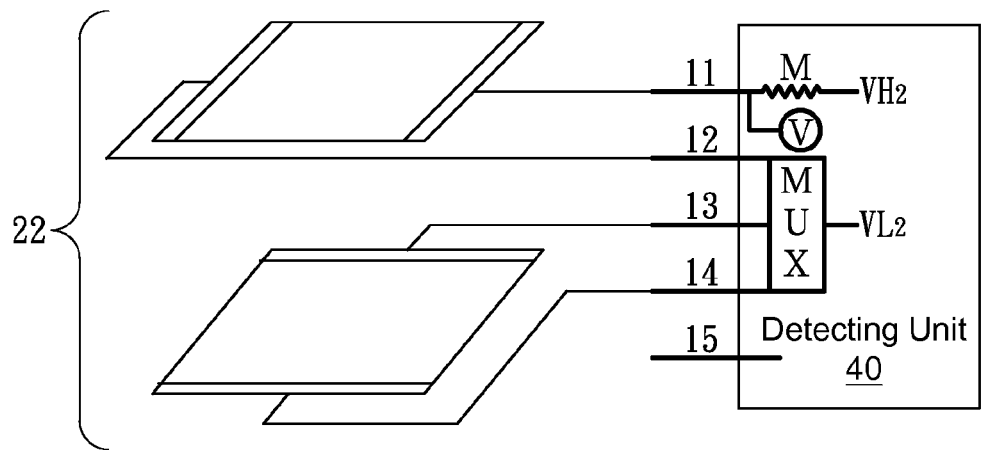
FIGS. 6A to 6D are schematic diagrams illustrating connection with a 4-terminal resistive touch panel via five terminals according to the third embodiment of the present invention.
Figure 6B:
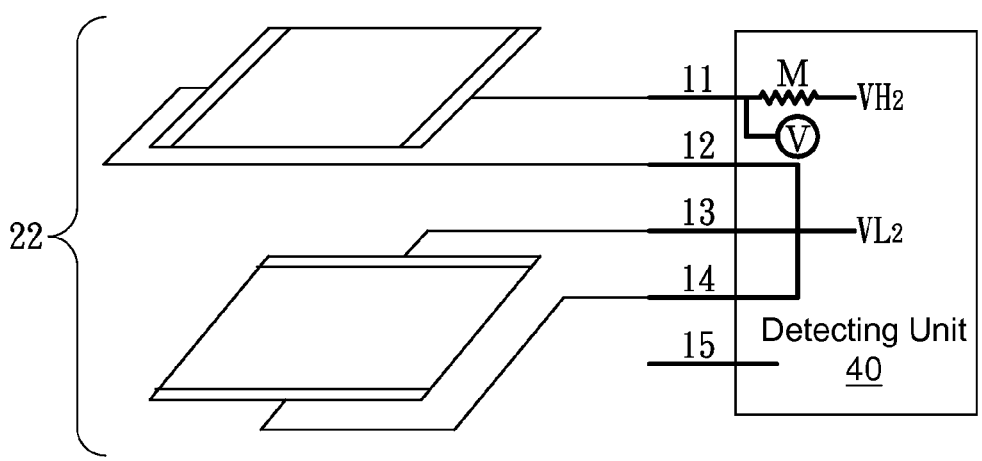
Figure 6C:
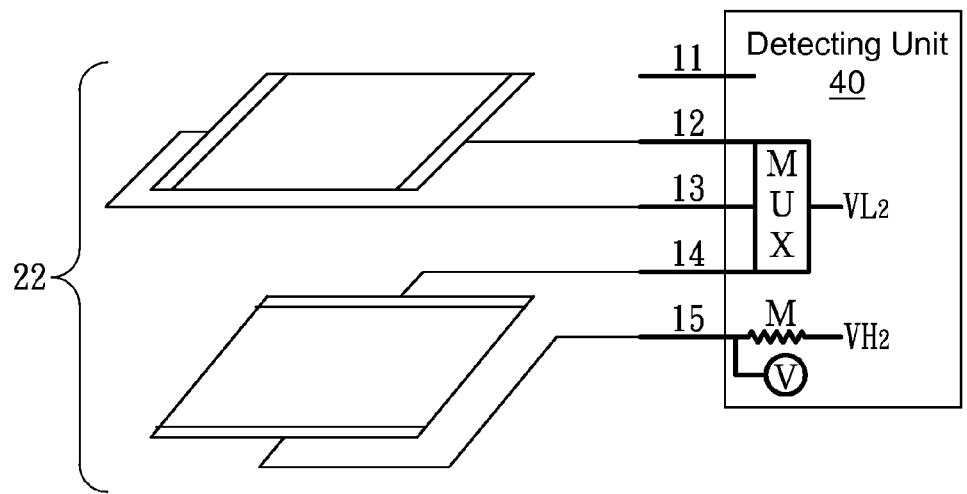
Figure 6D:
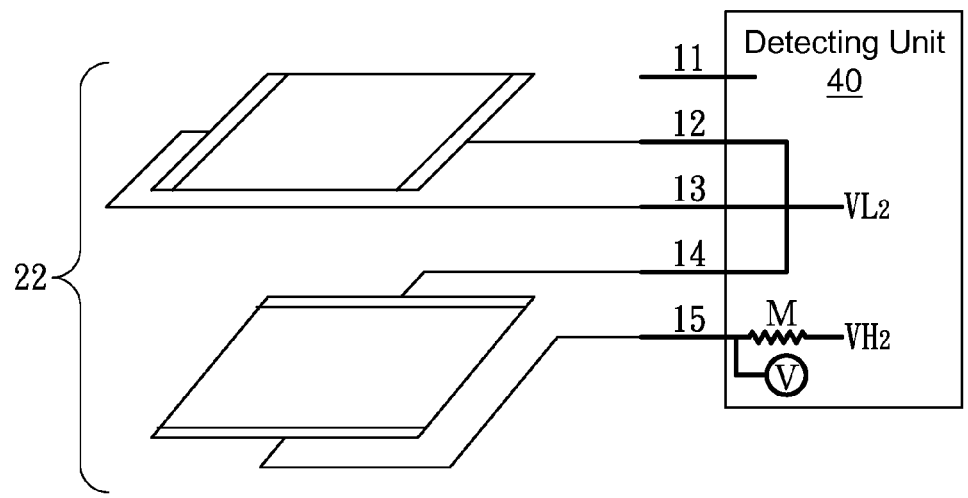

For example, in FIGS. 6A and 6B, the second high potential VH2 is provided to the first terminal 11, and the second low potential VL2 is sequentially or simultaneously provided to the neighboring second, third and fourth terminals 12, 13 and 14. When the 4-terminal resistive touch panel is connected to the first four terminals, it may be determined that the connection between first terminal 11 and one of the other three neighboring terminals is a closed circuit, whereas when the 4-terminal resistive touch panel is connected to the last four terminals, it may be determined that the connections between first terminal 11 and the other three neighboring terminals are all closed circuits. Similarly, as shown in FIGS. 6C and 6D, the second high potential VH2 is provided to the fifth terminal 11 and the second low terminal VL2 is sequentially or simultaneously provided to the other three terminals: the second, third and fourth terminals 12, 13 and 14.

The fourth embodiment of the present invention is a method for detecting the terminal connections of a 4-terminal resistive touch panel, as shown in FIG. 7. First, as shown in step 710, third high and low potentials are respectively provided to a pair of first terminals at different layers of the 4-terminal resistive touch panel connected to four terminals. Subsequently, as shown in step 720, terminals at the same layer of the 4-terminal resistive touch panel are determined based on the signal of at least one terminal in a second pair of terminals connected to the 4-terminal resistive touch panel 22.

When the first pair of terminals at different layers of the 4-terminal resistive touch panel is known, in the case that the touch panel 20 is untouched, the terminals of the same layer will remain at the same potential, thus the terminals in the first and second pairs of terminals having the same potential are at the same layer of the 4-terminal resistive touch panel 22.

In a preferred example of the present invention, the provision of the third high and low potentials and the determination of the second pair of terminals are achieved by the detecting unit 40, as shown in FIG. 8. If the sensed terminal and the terminal provided with the third high potential VH3 are connected to the same layer of the 4-terminal resistive touch panel 22, and the touch panel 20 is untouched, then there is an open circuit between the terminals provided with the third high potential VH3 and the third low potential VL3, and the sensed terminal and the terminal provided with the third high potential VH3 remains at the same potential. Similarly, if the sensed terminal and the terminal provided with the third low potential VL3 are connected to the same layer of the 4-terminal resistive touch panel 22, the sensed terminal and the terminal provided with the third low potential VL3 remains at the same potential.

Accordingly, terminals connected to the same layer of the 4-terminal resistive touch panel 22 can be determined by sensing one of the second pair of terminals. One skilled in the art may recognized that the second pair of terminals can be sensed sequentially or simultaneously in order to determine the terminals connected to the same layer of the 4-terminal resistive touch panel 22.

Figure 9A:
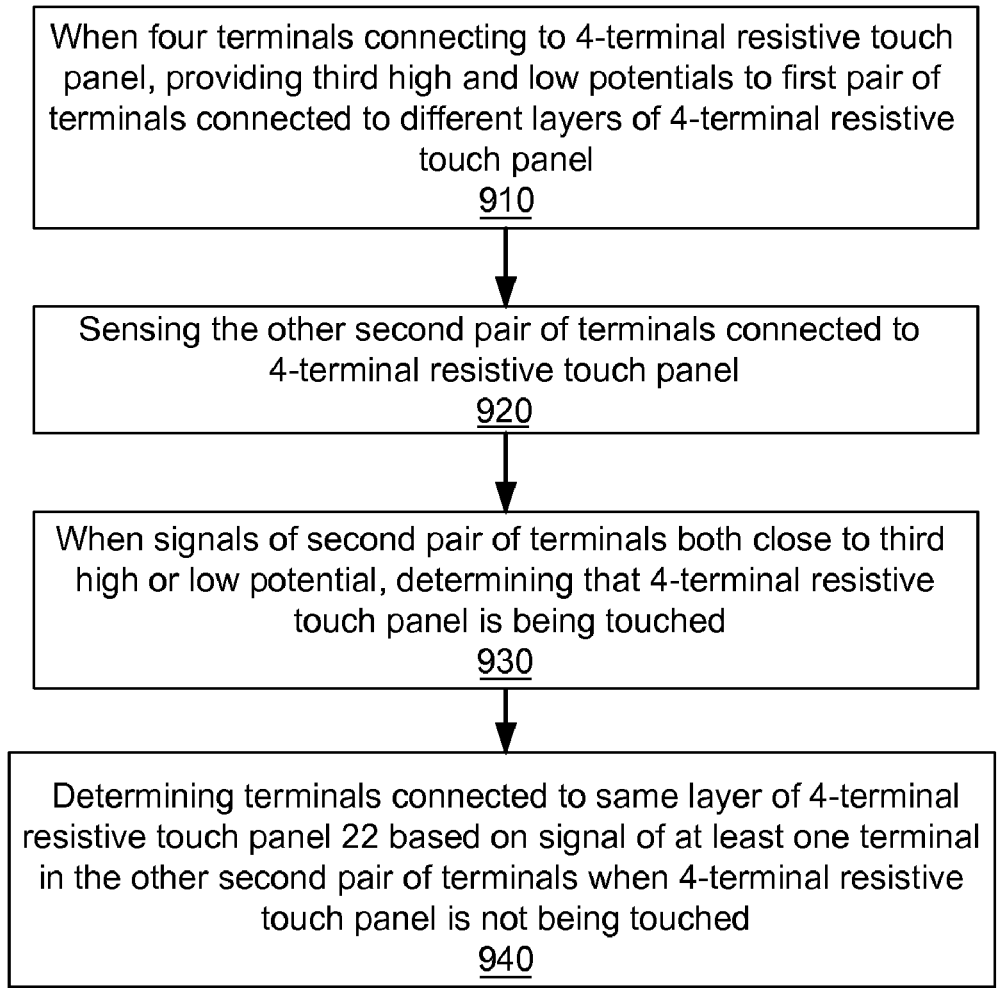
FIG. 9A is a flowchart illustrating determination of whether the 4-terminal resistive touch panel is being touched according to the fourth embodiment of the present invention.

However, when sensing the second pair of terminals, and the touch panel 20 is touched, there is a closed circuit between the terminals provided with the third high and low potentials, respectively. Thus, the above method for determining terminals connected to the same layer of the 4-terminal resistive touch panel 22 is not necessarily applicable. Specifically, when the electrical element M is used for providing the high and low potentials, the second pair of terminals may approach the same potential or same logic level. Accordingly, in a preferred example of the present invention shown in FIGS. 9A and 9B, it further includes a step of determining whether the 4-terminal resistive touch panel is being touched. First, as shown in step 910, third high and low potentials are respectively provided to a pair of first terminals at different layers of the 4-terminal resistive touch panel connected to the four terminals, wherein the third high and low potentials VH3 and VL3 are provided by an electrical element M. The resistance of the electrical element M is larger than that of the 4-terminal resistive touch panel 22. Subsequently, as shown in step 920, signals a second pair of terminals connected to the 4-terminal resistive touch panel 22 is sensed. Thereafter, in step 930, when the second pair of terminals both approaching the third high potential VH3 or the third low potential VL4, it is determined that the 4-terminal resistive touch panel 22 is being touched. Also, in step 940, when the 4-terminal resistive touch panel 22 is untouched, terminals at the same layer of the 4-terminal resistive touch panel 22 can be determined according to the signal of at least one terminal in the second pair.

In a preferred example of the present invention, the 4-terminal resistive touch panel 22 can also be determined as being touched when the signals of the second pair of terminals are both at a high logic level or a low logic level. In another preferred example of the present invention, the 4-terminal resistive touch panel 22 can also be determined as being touched when the signal between the electrical element M and a terminal provided with a high potential through the electrical element M approaches a low potential or low logic level. Similarly, the 4-terminal resistive touch panel 22 can also be determined as being touched when the signal between the electrical element M and a terminal provided with a low potential through the electrical element M approaches a high potential or high logic level. In other words, the 4-terminal resistive touch panel 22 can also be determined as being touched when the signal between the electrical element M and the terminal connected to the electrical element M in the first pair of terminals are different from the signal provided to the electrical element M.

Comparison of two terminals can be a comparison to see if they are the same or close to each other after simultaneous or sequential sensing. A comparator, subtractor or a differential amplifier can also be used to for comparison; but the present invention is not limited to these. In another preferred example of the present invention, it can be determined that whether the terminals of the same layer in the 4-terminal resistive touch panel 22 are being touched based on the logic level of the signal between the electrical element M and the terminal provided with the high potential.

Accordingly, as long as the first pair of terminals at different layers of the 4-terminal resistive touch panel 22 is known, even if the 4-terminal resistive touch panel is being touched, the terminals connected to the same layer of the 4-terminal resistive touch panel 22 can be determined once the 4-terminal resistive touch panel 22 is not being touched.

The four terminals of this embodiment include, but not limited to, four independent terminals or the first or last four of the five terminals. One skilled in the art can appreciate that the four terminals can also be included in other quantities of terminals; the present invention is not limited to these.

This embodiment is based on the fact that the first pair of terminals connecting to different layers of the 4-terminal resistive touch panel 22 is known. Accordingly, a fifth embodiment of the present invention is a method for detecting connections of a 4-terminal resistive touch panel. As shown in FIG. 10, a first pair of terminals connecting to different layers of the 4-terminal resistive touch panel 22 can be determined First, in step 1010, a fourth high potential and a fourth low potential are respectively provided to two of four terminals connected with the 4-terminal resistive touch panel 22. Subsequently, as shown in step 1020, a first pair of terminals connecting to different layers of the 4-terminal resistive touch panel 22 is determined based on whether there is an open circuit or closed circuit between the terminals provided with the fourth high and low potentials.

Figure 11A:
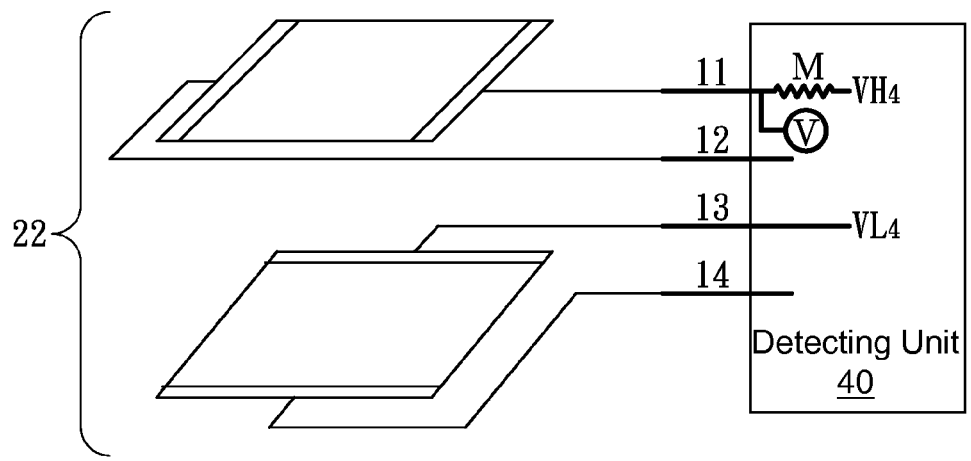
FIGS. 11A and 11B are schematic diagrams depicting determination of a pair of terminals connected to different layers of the 4-terminal resistive touch panel 22 according to a fifth embodiment of the present invention.
Figure 11B:
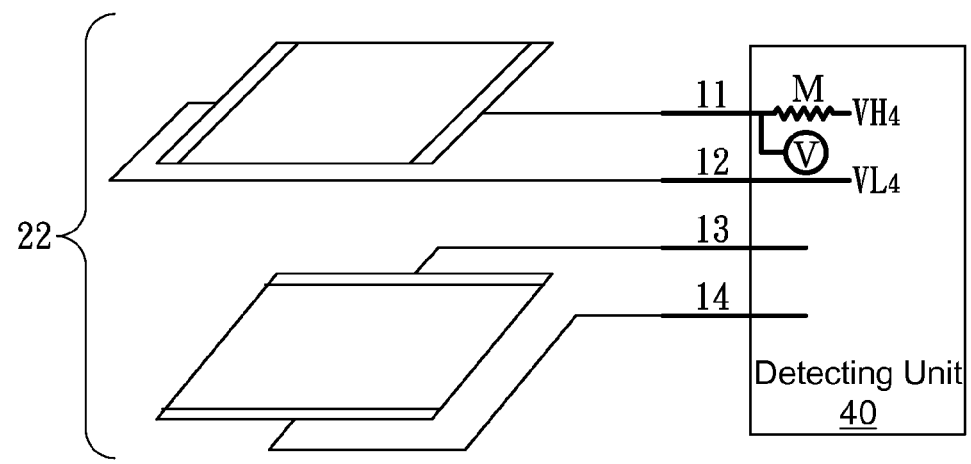

In a preferred example of the present invention, the provision of the fourth high and low potentials and the determining of whether the connection between the terminals provided with the fourth high and low potentials is an open circuit or a closed circuit are achieved by the detecting unit 40. As shown in FIG. 11A, if the terminals provided with the fourth high potential VH4 and the fourth low potential VL4 are connected to different layers of the 4-terminal resistive touch panel 22, and the touch panel 20 is not touched, there is an open circuit between the terminals provided with the fourth high potential VH4 and the fourth low potential VL4. Conversely, as shown in FIG. 11B, if the terminals provided with the fourth high potential VH4 and the fourth low potential VL4 are connected to the same layer of the 4-terminal resistive touch panel 22, and the touch panel 20 is not touched, there is a closed circuit between the terminals provided with the fourth high potential VH4 and the fourth low potential VL4, thereby determining a first pair of terminals that are connected to different layers of the 4-terminal resistive touch panel 22.

In other words, the sensing unit 40 provides high and low potentials to a pair of terminals, respectively. By determining whether there is an open circuit between terminals provided with the high and low potentials, it can be determined that whether the terminals provided with the high and low potentials are connected to the same layer of the 4-terminal resistive touch panel 22. If the terminals provided with the high and low potentials are connected to the same layer of the 4-terminal resistive touch panel 22, then the terminal provided with the high or low potential and any one of the other pair of terminals are connected to different layers of the 4-terminal resistive touch panel 22. When the terminals connected to the same layer of the 4-terminal resistive touch panel 22 are all known, detecting can be omitted.

If the terminals provided with the high and low potentials are connected to the different layers of the 4-terminal resistive touch panel 22, then the sensing unit 40 can provide high and low potentials to the terminals connected to the different layers of the 4-terminal resistive touch panel 22, respectively, and sensing at least one terminal of the other pair of terminals. Assuming that the 4-terminal resistive touch panel 22 is not touched, and there is an open circuit between the terminals provided with the high and low potentials, thus if the signal of the terminal being sensed is at high potential, then the sensed terminal and the terminal provided with the high potential are connected to the same layer of the 4-terminal resistive touch panel 22; if the signal of the terminal being sensed is at low potential, then the sensed terminal and the terminal provided with the low potential are connected to the same layer of the 4-terminal resistive touch panel 22. As mentioned earlier, the sensing of the terminals can be directly done through determination of the logic level of the terminal signal; measuring of the actual signal value is not necessarily required.

Figure 12:
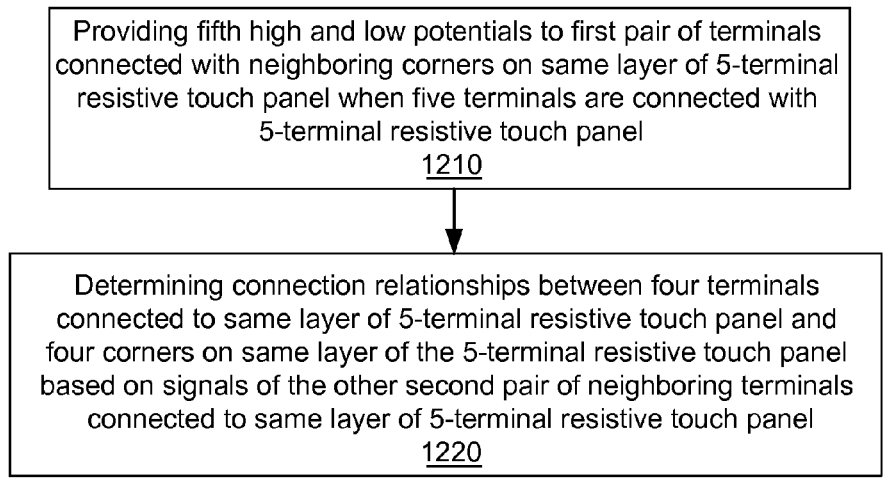
FIG. 12 is a flowchart illustrating detecting connections of a 5-terminal resistive touch panel according to a sixth embodiment of the present invention.

A sixth embodiment of the present invention is a method for detecting connections of a 5-terminal resistive touch panel as shown in FIG. 12. First, as shown in step 1210, when five terminals are connected to a 5-terminal resistive touch panel 24, a fifth high potential and a fifth low potential are respectively provided to a first pair of neighboring terminals at the neighboring corners of the same layer of the 5-terminal resistive touch panel 24. Next, as shown in step 1220, connection relationships between four terminals connected to the same layer of the 5-terminal resistive touch panel 24 and four connected corners at the same layer of the 5-terminal resistive touch panel 24.

Figure 13:
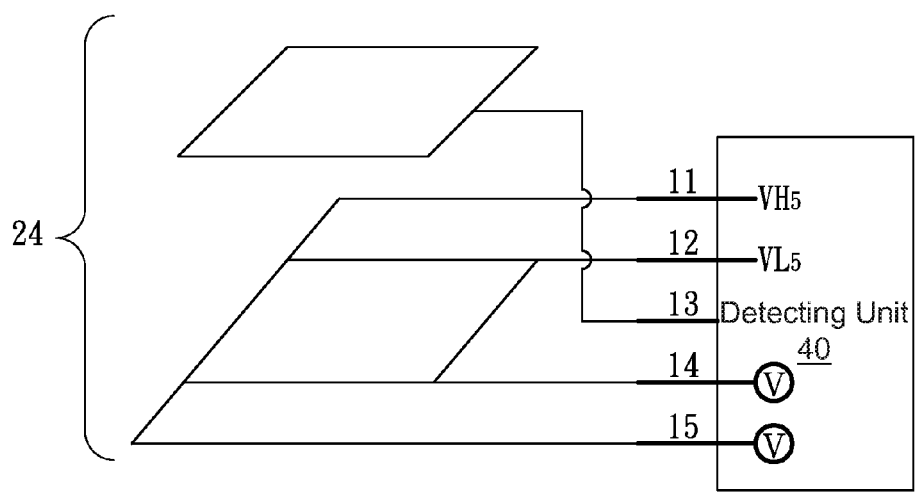
FIG. 13 is a schematic diagram depicting detecting connections of a 5-terminal resistive touch panel by a detecting unit according to the sixth embodiment of the present invention.

In a preferred example of the present invention, the provision of the fifth high and low potentials and the determining of signals from a second pair of neighboring terminals are achieved by the detecting unit 40, as shown in FIG. 13.

Since the first pair of neighboring terminals provided with the fifth high and low potentials VH5 and VL5 are connected to the neighboring corners on the same layer of the 5-terminal resistive touch panel 24, thus the terminal in the second pair of neighboring terminals having the larger signal and the terminal in the first pair of neighboring terminals provided with the fifth high potential VH5 are connected at neighboring corners, and the terminal in the second pair of neighboring terminals having the smaller signal and the terminal in the first pair of neighboring terminals provided with the fifth low potential VL5 are connected at neighboring corners, thereby determining the connection relationships between the four terminals connected to the same layer of the 5-terminal resistive touch panel 24 and the four connected corners on the same layer of the 5-terminal resistive touch panel 24.

Figure 14:
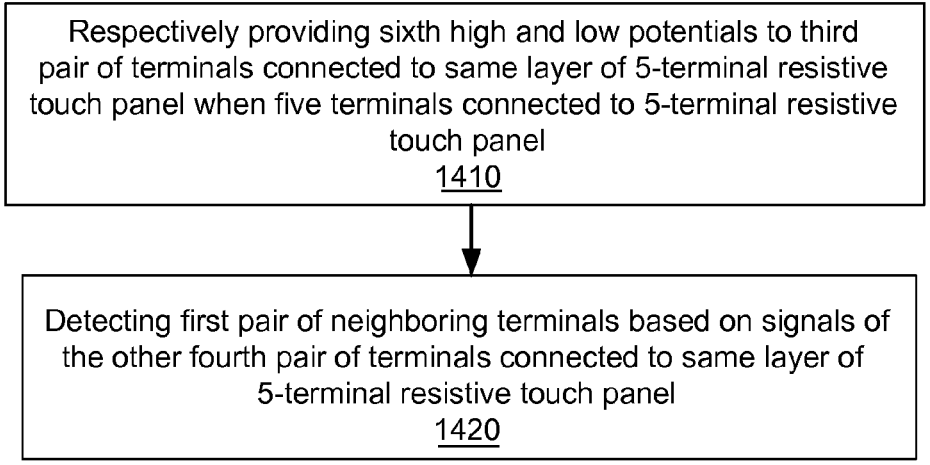
FIG. 14 is a flowchart illustrating determination of a first pair of neighboring terminals according to the sixth embodiment of the present invention.

The above method for detecting connections of a 5-terminal resistive touch panel is based on the fact that the first pair of neighboring terminals is already known. Thus, in a preferred example of the present invention, a method for determining the first pair of neighboring terminals is provided, as shown in FIG. 14. First, in step 1410, when five terminals are connected to the 5-terminal resistive touch panel 24, a sixth high potential and a sixth low potential are provided to a third pair of terminals on the same layer of the 5-terminal resistive touch panel 24, respectively. Next, in step 1420, the first pair of neighboring terminals is detected based on signals from yet a fourth pair of terminals on the same layer of the 5-terminal resistive touch panel 24.

Figure 15:
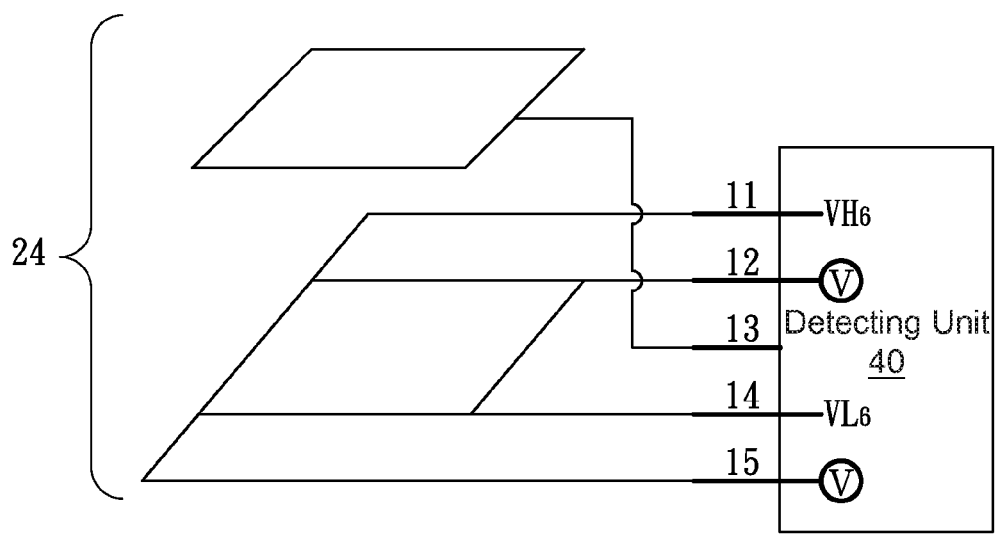
FIG. 15 is a schematic diagram depicting determination of the first pair of neighboring terminals by a detecting unit according to the sixth embodiment of the present invention.

In a preferred example of the present invention, the provision of the sixth high and low potentials and the sensing of signals from the fourth pair of terminals are achieved by the detecting unit 40, as shown in FIG. 15.

The third pair of terminals can be any pair of terminals connected to the four corners on the same layer of the 5-terminal resistive touch panel 24, while the fourth pair of terminals is the other pair of terminals. Regardless of whether the third pair of terminals is connected to neighboring corners on the same layer of the 5-terminal resistive touch panel 24, the terminal in the fourth pair of neighboring terminals having the larger signal and the terminal in the third pair of neighboring terminals provided with the sixth high potential VH6 are connected at neighboring corners, while the terminal in the fourth pair of neighboring terminals having the smaller signal and the terminal in the third pair of neighboring terminals provided with the sixth low potential VL6 are connected at neighboring corners.

If the fourth pair of terminals is the same or close to each other, then the terminals provided with the sixth high and low potentials VH6 and VL6 are not at neighboring corners; and the 5-terminal resistive touch panel 24 is generally a square shape with the fourth pair of terminals and the third pair of terminals adjacent to each other.

In a best mode of the present invention, the high potential is provided by an electrical element M. For example, the high potential is provided to the first terminal 11 via the electrical element M. Thus, when one tries to determine whether the touch panel 20 is a 4-terminal resistive touch panel 22 or a 5-terminal resistive touch panel 24, it can be achieved quickly through the logic level of the signal between the electrical element M and the first terminal 11. Similarly, when the touch panel 20 is a 4-terminal resistive touch panel 22, it can be quickly determined as to whether the 4-terminal resistive touch panel 22 is connected with the first or last four terminals by determining the logic level of the signal between the electrical element M and the first terminal 11.

As mentioned above, comparison of two terminals can be a comparison to see if they are the same or close to each other after simultaneous or sequential sensing. A comparator, subtractor or a differential amplifier can also be used to for comparison; but the present invention is not limited to these.

In each embodiment of the present invention, the first to sixth high potentials may include, but not limited to, the same potential, or partially the same or all different potentials. Similarly, the first to sixth low potentials may include, but not limited to, the same potential, or partially the same or all different potentials.

The above embodiments are only used to illustrate the principles of the present invention, and they should not be construed as to limit the present invention in any way. The above embodiments can be modified by those with ordinary skills in the arts without departing from the scope of the present invention as defined in the following appended claims.

What is claimed is:

1. A device for detecting connections of a 5-terminal resistive touch panel, comprising:
    five terminals connecting to a 5-terminal resistive touch panel; and
    a detecting unit, comprising:
        providing first high and low potentials to a first pair of neighboring terminals connected to neighboring corners on the same layer of the 5-terminal resistive touch panel, respectively; and
        determining the connection relationships between the four terminals connected to the same layer of the 5-terminal resistive touch panel and four corners on the same layer of the 5-terminal resistive touch panel based on signals of a second pair of neighboring terminals connected to the same layer of the 5-terminal resistive touch panel.

2. The device for detecting connections of a 5-terminal resistive touch panel of claim 1, wherein the terminal in the second pair of neighboring terminals having a larger signal and the terminal provided with the first high potential are connected to neighboring corners on the same layer of the 5-terminal resistive touch panel, and the terminal in the second pair of neighboring terminals having a smaller signal and the terminal provided with the first low potential are connected to neighboring corners on the same layer of the 5-terminal resistive touch panel.

3. The device for detecting connections of a 5-terminal resistive touch panel of claim 1, wherein when signals of the second pair of neighboring terminals are the same, any one of the second pair of neighboring terminals and any one of the first pair of neighboring terminals are connected to neighboring corners of the same layer of the 5-terminal resistive touch panel.

4. The device for detecting connections of a 5-terminal resistive touch panel of claim 1, wherein the detecting unit further comprises:
    providing first and second low potentials to a first pair of terminals connected to the same layer of the 5-terminal resistive touch panel; and
    detecting the first pair of neighboring terminals based on the signals of the other second pair of terminals connected to the same layer of the 5-terminal resistive touch panel.

5. The device for detecting connections of a 5-terminal resistive touch panel of claim 4, wherein the terminal in the second pair of terminals having a larger signal and the terminal provided with the first high potential are connected to neighboring corners on the same layer of the 5-terminal resistive touch panel, and the terminal in the second pair of terminals having a smaller signal and the terminal provided with the first low potential are connected to neighboring corners on the same layer of the 5-terminal resistive touch panel.

6. The device for detecting connections of a 5-terminal resistive touch panel of claim 4, wherein when signals of the second pair of neighboring terminals are the same, any one of the first pair of neighboring terminals and any one of the second pair of neighboring terminals are connected to neighboring corners of the same layer of the 5-terminal resistive touch panel.

7. A device for detecting connections of a 5-terminal resistive touch panel, comprising:
 five terminals connecting to a 5-terminal resistive touch panel; and
 a detecting unit, comprising:
  providing second high and low potentials to a first pair of neighboring terminals connected to the same layer of the 5-terminal resistive touch panel, respectively; and
  detecting the first pair of neighboring terminals based on a signal of a second pair of terminals connected to the same layer of the 5-terminal resistive touch panel.

8. The device for detecting connections of a 5-terminal resistive touch panel of claim 7, wherein the terminal in the second pair of neighboring terminals having a larger signal and the terminal provided with the first high potential are connected to neighboring corners on the same layer of the 5-terminal resistive touch panel, and the terminal in the second pair of neighboring terminals having a smaller signal and the terminal provided with the first low potential are connected to neighboring corners on the same layer of the 5-terminal resistive touch panel.

9. The device for detecting connections of a 5-terminal resistive touch panel of claim 7, wherein when signals of the second pair of terminals are the same, any one of the first pair of neighboring terminals and any one of the second pair of neighboring terminals are connected to neighboring corners of the same layer of the 5-terminal resistive touch panel.

10. The device for detecting connections of a 5-terminal resistive touch panel of claim 7, wherein the detecting unit further comprises:
 providing first and second low potentials to a first pair of neighboring terminals connected to neighboring corners on the same layer of the 5-terminal resistive touch panel; and
 determining the connection relationships between the four terminals connected to the same layer of the 5-terminal resistive touch panel and four corners on the same layer of the 5-terminal resistive touch panel based on signals of the other second pair of neighboring terminals connected to the same layer of the 5-terminal resistive touch panel.

11. The device for detecting connections of a 5-terminal resistive touch panel of claim 10, wherein the terminal in the second pair of terminals having a larger signal and the terminal provided with the first high potential are connected to neighboring corners on the same layer of the 5-terminal resistive touch panel, and the terminal in the second pair of terminals having a smaller signal and the terminal provided with the first low potential are connected to neighboring corners on the same layer of the 5-terminal resistive touch panel.

12. The device for detecting connections of a 5-terminal resistive touch panel of claim 10, wherein when signals of the second pair of neighboring terminals are the same, any one of the second pair of neighboring terminals and any one of the first pair of neighboring terminals are connected to neighboring corners of the same layer of the 5-terminal resistive touch panel.

13. A method for detecting connections of a 5-terminal resistive touch panel, comprising:
 providing first high and low potentials to a first pair of neighboring terminals connected to neighboring corners on the same layer of the 5-terminal resistive touch panel, respectively; and
 determining the connection relationships between the four terminals connected to the same layer of the 5-terminal resistive touch panel and four corners on the same layer of the 5-terminal resistive touch panel based on signals of a second pair of neighboring terminals connected to the same layer of the 5-terminal resistive touch panel.

14. The method for detecting connections of a 5-terminal resistive touch panel of claim 13, wherein the terminal in the second pair of neighboring terminals having a larger signal and the terminal provided with the first high potential are connected to neighboring corners on the same layer of the 5-terminal resistive touch panel, and the terminal in the second pair of neighboring terminals having a smaller signal and the terminal provided with the first low potential are connected to neighboring corners on the same layer of the 5-terminal resistive touch panel.

15. The method for detecting connections of a 5-terminal resistive touch panel of claim 13, wherein when signals of the second pair of neighboring terminals are the same, any one of the second pair of neighboring terminals and any one of the first pair of neighboring terminals are connected to neighboring corners of the same layer of the 5-terminal resistive touch panel.

16. The method for detecting connections of a 5-terminal resistive touch panel of claim 13, further comprising:
 providing first and second low potentials to a first pair of terminals connected to the same layer of the 5-terminal resistive touch panel; and
 detecting the first pair of neighboring terminals based on the signals of the other second pair of terminals connected to the same layer of the 5-terminal resistive touch panel.

17. The method for detecting connections of a 5-terminal resistive touch panel of claim 16, wherein the terminal in the second pair of terminals having a larger signal and the terminal provided with the first high potential are connected to neighboring corners on the same layer of the 5-terminal resistive touch panel, and the terminal in the second pair of terminals having a smaller signal and the terminal provided with the first low potential are connected to neighboring corners on the same layer of the 5-terminal resistive touch panel.

18. The method for detecting connections of a 5-terminal resistive touch panel of claim 16, wherein when signals of the second pair of neighboring terminals are the same, any one of the first pair of neighboring terminals and any one of the second pair of neighboring terminals are connected to neighboring corners of the same layer of the 5-terminal resistive touch panel.

19. A method for detecting connections of a 5-terminal resistive touch panel, comprising:
 providing second high and low potentials to a first pair of neighboring terminals connected to the same layer of the 5-terminal resistive touch panel, respectively; and
 detecting the first pair of neighboring terminals based on a signal of a second pair of terminals connected to the same layer of the 5-terminal resistive touch panel.

20. The method for detecting connections of a 5-terminal resistive touch panel of claim 19, wherein the terminal in the second pair of neighboring terminals having a larger signal and the terminal provided with the first high potential are connected to neighboring corners on the same layer of the 5-terminal resistive touch panel, and the terminal in the second pair of neighboring terminals having a smaller signal and the terminal provided with the first low potential are connected to neighboring corners on the same layer of the 5-terminal resistive touch panel.

21. The method for detecting connections of a 5-terminal resistive touch panel of claim 19, wherein when signals of the second pair of terminals are the same, any one of the first pair of neighboring terminals and any one of the second pair of neighboring terminals are connected to neighboring corners of the same layer of the 5-terminal resistive touch panel.

22. The method for detecting connections of a 5-terminal resistive touch panel of claim 19, further comprising:
   providing first and second low potentials to a first pair of neighboring terminals connected to neighboring corners on the same layer of the 5-terminal resistive touch panel; and
   determining the connection relationships between the four terminals connected to the same layer of the 5-terminal resistive touch panel and four corners on the same layer of the 5-terminal resistive touch panel based on signals of the other second pair of neighboring terminals connected to the same layer of the 5-terminal resistive touch panel.

23. The method for detecting connections of a 5-terminal resistive touch panel of claim 22, wherein the terminal in the second pair of terminals having a larger signal and the terminal provided with the first high potential are connected to neighboring corners on the same layer of the 5-terminal resistive touch panel, and the terminal in the second pair of terminals having a smaller signal and the terminal provided with the first low potential are connected to neighboring corners on the same layer of the 5-terminal resistive touch panel.

24. The method for detecting connections of a 5-terminal resistive touch panel of claim 23, wherein when signals of the second pair of neighboring terminals are the same, any one of the second pair of neighboring terminals and any one of the first pair of neighboring terminals are connected to neighboring corners of the same layer of the 5-terminal resistive touch panel.

* * * * *